Figure 1:
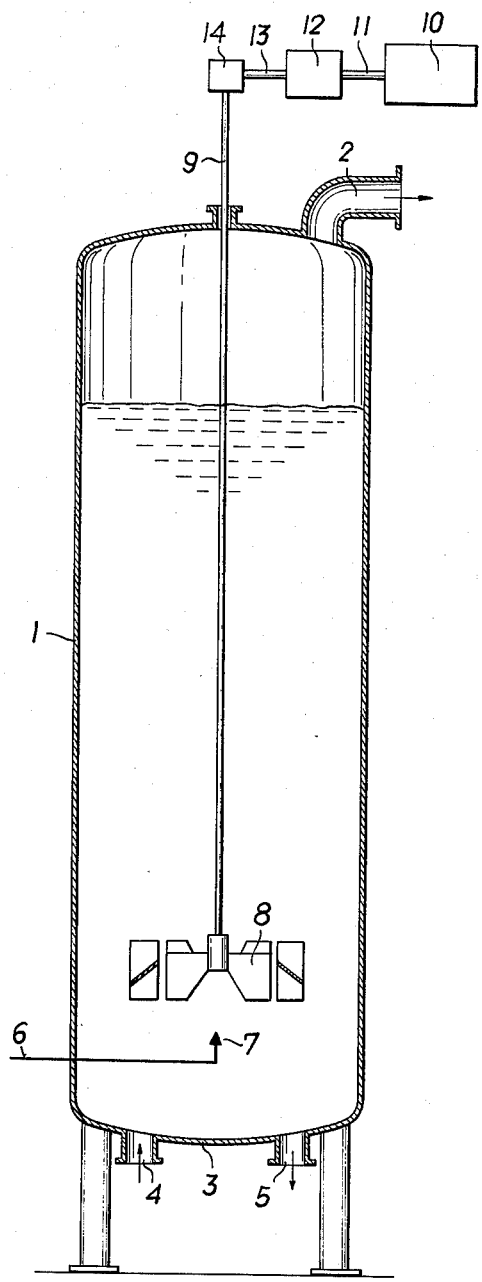

United States Patent [19]
Senolt et al.

[11] 3,923,633
[45] Dec. 2, 1975

[54] BITUMEN BLOWING

[75] Inventors: Hans Senolt; Heinrich Tomaschko; Georg Palvik, all of Vienna, Austria

[73] Assignee: Osterreichische Mineralolverwaltung Aktiengesellschaft, Vienna, Austria

[22] Filed: Oct. 27, 1972

[21] Appl. No.: 301,328

Related U.S. Application Data

[63] Continuation of Ser. No. 78,036, Oct. 5, 1970, abandoned.

[30] Foreign Application Priority Data

Oct. 3, 1969  Austria .......................... 9331/69

[52] U.S. Cl. .................................................. 208/6
[51] Int. Cl.² ......................................... C01G 27/00
[58] Field of Search ........................................ 208/6

[56] References Cited
UNITED STATES PATENTS 2,095,190  10/1937  Heuscher ............................. 208/6
3,258,419  6/1966  Hanson ................................. 208/6

OTHER PUBLICATIONS

Calderbauk, Trans. Inst. Chem. Engineers, Vol. 36, p. 444, 1958.

*Primary Examiner*—Veronica O'Keefe
*Attorney, Agent, or Firm*—Holman & Stern

[57] ABSTRACT

A bitumen blowing method bitumen blowing air into a body of bitumen, subjecting the bitumen to agitation to disperse the air therein to form a mixture of air and bitumen, increasing the intensity of the agitation when the amount of air in the air and bitumen mixture increases, and decreasing the intensity of the agitation when the amount of air in the air and bitument mixture decreases. A bitumen blowing reactor suitable for carrying out the method comprises: a reactor vessel having an air inlet; bitumen-agitating means in the vessel; a torque convertor arranged to drive the agitating means; and a drive motor arranged to drive the torque converter.

2 Claims, 2 Drawing Figures

U.S. Patent  Dec. 2, 1975  3,923,633

BITUMEN BLOWING

This application is a continuation of application Ser. No. 78,036 filed Oct. 5, 1970, now abandoned.

The invention relates to a bitumen blowing method in which the air is blown into the contents of the reactor vesel and finely dispersed by stirring, as also to a device for use with the method.

Bitumen is a very viscous liquid or a solid, consisting essentially of hydrocarbons and their derivatives, which is soluble in carbon disulphide. It is substantially non-volatile and softens gradually when heated. It is black or brown in colour and possesses waterproffing and adhesive properties. It is obtained principally by refinery processes from petroleum, and is also found as a natural deposit or, in association with mineral matter as a component of naturally occurring asphalt.

Asphalt is a natural or mechanical mixture of bitumen with a substantial proportion of solid mineral matter.

It is a wellknown fact that bitumen blowing is used to produce asphaltic bitumen of desired consistency from what is known as soft bitumen. The size of the surface of contact the exchange surface, between the hot soft bitumen and the air forced into it, is a decisive factor in determining the length of the blowing process and quantity of air used.

There are conventionally two methods of ensuring a fine dispersion of air in the bitumen.

a. Immediate fine distribution by means of jets or nozzles which may be in the form of perforated tubes such as spinnerets or rings, or by means such as filter plates, sinter plates or ejectors. The force required for distribution of the air is achieved when this method is used, by increasing the air pressure substantially above the hydrostatic pressure of the bitumen, that is to say by using an air compressor, the efficiency of which is only about 0.5.

b. Preliminary course distribution, in which the air pressure is only slightly higher than the hydrostatic pressure of the bitumen, followed by a fine dispersion by mechanical means, such as agitator vanes or turbines or the like. The distribution effect achieved by the mechanical means is thus combined directly with the blowing process and the effectiveness of the agitators is approximately 0.95.

Each of the two methods (a) and (b) has, moreover, special advantages and disadvantages. However, in both cases optimum air distribution can only by achieved at a certain gas pressure $V_Q$ which is determined by the ratio of the quantity of air flowing in per second (cm3/sec.) to reaction area (cm2). Any increase in the rate of air flow per second has the effect of enlarging the diameter of the air jet $d_{B1}$ and hence reducing the specific area $a$ of the air bubbles, which means that the degree of exploitation of the air is lowered. The specific area is defined, as is wellknown, by the ratio of the surface of air bubbles to the volume of the bubbles, i.e.

$$a = \frac{d_{B1}^2 . \Pi}{\frac{d_{B1}^3 . \Pi}{6}} = \frac{6}{d_{B1}} [cm^{-1}]$$

In the case of method (a), the rate of airflow is associated with an increase in the air pressure, i.e., with an increase in desired air compressor efficiency, whereas in the case of method (b), the efficiency required of the agitator system decreases as the rate of airflow increases while the air pressure, which only corresponds to the hydrostatic pressure of the column of bitumen, remains the same.

It is, however, impossible in the practice of bitumen blowing to avoid varying the amount of air blown in since the conditions of the reaction have to be varied according to the quality of the raw materials used or of the finished product required. In the case of method (a) however, a variation in the rate of airflow which is coupled with optimum air distribution is only possible if structural modifications are made to the apparatus in that, for example, either the size or number of jets are altered.

The present invention is based on method (b) and involves the use of an agitator. Acording to Calderbank "The interfacial area in gas-liquid contacting with mechanical agitation" (Transactions Institution of Chemical Engineers, Vol. 36 1958, page 444) the average diameter of air bubbles which can be attained when liquids are acted upon by a jet of air in conjunction with mechanical agitators is $$d_{B1} = \frac{C.\sigma^{0.6}}{\left(\frac{L}{V}\right)^{0.4} \phi_{Dis}^{0.2}}$$

when C is an apparatus constant, $\Sigma$ the surface tension of the liquid, L the power consumption of the agitator, V the dispersion volume and $\phi$ Dis the dispersion density.

Since for a given quality of bitumen and with a certain reaction temperature the surface tension $\Sigma$ will be fixed, while the dispersion density $\phi_{Dis}$ will also take on a certain fixed value for a given rate of airflow, the remaining parameters influencing the diameter of the air bubbles, will be the power consumption of the agitator L and the dispersion volume V. Thus in order to achieve the aim of a specific area $a$ which is as large as possible, which is the same as an air bubble diameter $d_{B1}$ which is as small as possible, either L must be kept very high or V very low in value.

The aim of the present invention, in what concerns the agitator mechanism, is to make it possible to use the whole of the rated output of the drive motor and always to achieve optimum air distribution, while making it possible to vary the rate of airflow.

Accordingly, the invention provides a bitumen blowing method comprising blowing air into a body of bitumen, mechanically agitating the bitumen to disperse the air therein to form a mixture of air and bitumen, accelerating the agitation when the amount of air in the bitumen and air mixture increases and decelerating the agitation when the amount of air in the bitumen and air mixture decreases. This means that the agitator output can always be allowed to act directly on the contents of the reactor vessel. Thus when the mixture of bitumen and air has a higher air content, that is to say, when the dispersion density is low, the accelerated agitation requires the same output to distribute the air in the bitumen as when the air content is lower and agitation slower. As a result, air distribution efficiency is always in proportion to the air content of the bitumen and air mixture so that the air bubbles always are of the diameter required whatever the conditions of operation and whatever the variation in the rate of airflow.

In the case of a bitumen blowing process in which agitation is conventionally effected using a rotating agitator mechanism, the speed of the agitator mechanism may be increased or reduced as a function of the air content of the mixture of bitumen and air at any given moment by varying the torque. Thus it is possible very simply and reliably to accelerate or slow down the agitator as a function of the air content of the bitumen and air mixture at any given moment. As the air content of the mixture increases or decreases, the resistance of the medium to the agitator action is reduced or increased. Thus in accordance with the known equation.

$$M_d = 71\ 620\ \frac{N}{n}$$

when $M_d$ is the torque, $N$ the output in h.p. and $n$ the speed, and assuming a constant output, when torque is high and a substantial resistance to the action of the agitator is offered by the medium, speed is reduced, whereas as torque decreases, and hence the resistance of the medium to the agitator, the speed increases.

The device for use with the method of the invention, which is provided with a rotary agitator mechanism, is characterised in that in order to vary the speed of the agitator a torque converter is arranged between the agitator and the drive motor, which operates with a constant power consumption.

The power consumption of an agitator is expressed, according to Orlicek-Pöll, "Hilfsbuch fuer Mineraloeltechniker", Vol. 2, page 215, by the equation $$L - 7.17 \cdot 10^{-8} \cdot c \cdot n^3 \cdot d^5 \cdot \phi_{Dis}$$

when $L$ is the power consumption of the agitator in kw, $c$ is the agitator coefficient (apparatus constant), $n$ the speed, $d$ the diameter of the agitator and $\phi_{Dis}$ the density of the medium to be agitated in kg/m3. Hitherto when a mechanical agitator was installed in a reaction vessel, not only $c$ and $d$ but also $n$ were fixed values, since the agitator shaft was connected to the drive motor with a fixed gear ratio. The density $\phi_{Dis}$ is always a function of the blower conditions chosen, that is to say, on the quality of the material treated, on the temperature at which the bitumen is blown and especially of the rate of airflow. The density $\phi_{Dis}$ is in turn what determines the resistance offered to the agitator as it stirs the contents of the reactor vessel. The agitator must be capable of agitating the bitumen of $\phi_{Bit}$ density as it is before air has been applied at the commencement of the process. However, it must also be capable of effecting a preliminary or subsequent mixing process without the addition of air. The power consumption of the agitator $L_o$ for the agitation of bitumen to which no air is applied, at the beginning of the process or for the preliminary or subsequent mixing may be calculated by inserting the value $\phi_{Bit}$ in the equation given above.

When air is added, the power consumption of the agitator drops suddenly; this is due to the fact that on the one hand the density of the mixture of bitumen and air drops according to the air content while on the other hand air tends to circulate because of the density difference $\phi_{Bit} - \phi_{Dis}$. To calculate the output $L_m$ required to agitate the mixture of bitumen and air, the appropriate value $\phi_{Dis}$ for the density of the mixture should be inserted into the power consumption equation given above. The drop in power consumption of the agitator at any time is calculated by subtracting $L_m$ from $L_o$.

Thus in conventional arrangements the rated output of the drive motor is by no means exploited for the blowing period, that is to say for 95% of operating time. In contrast to this, the effect of the provisions, according to the invention, of a torque converter ensures that the full rated output of the motor may be made use of under all operating conditions.

Figure 2:
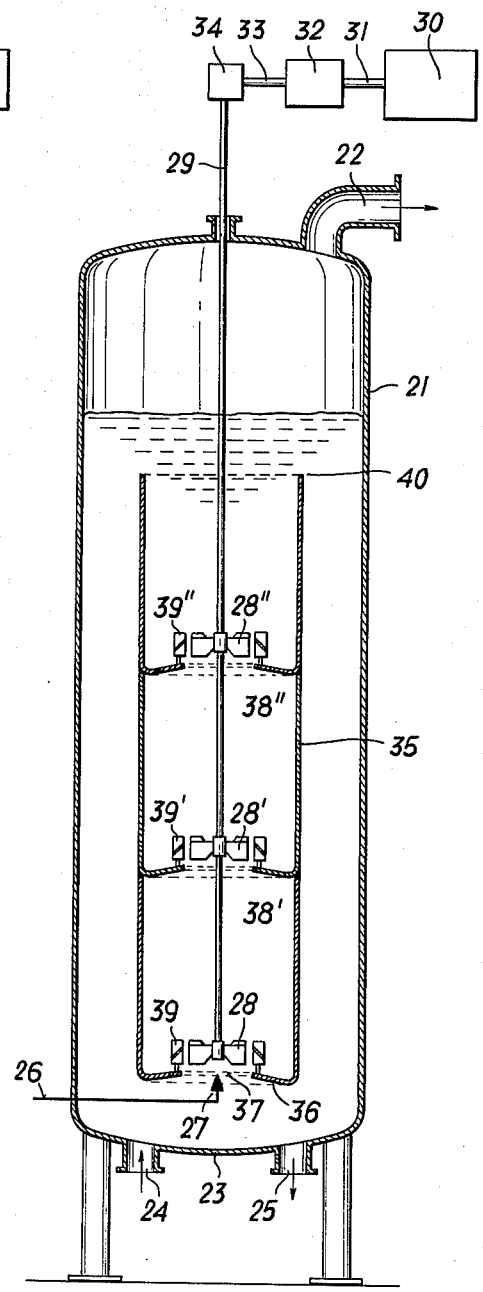

The invention will now be described by way of example with reference to the accompanying drawings in which:

FIG. 1 shows a longitudinal section through a bitumen blowing reactor according to the invention; and FIG. 2 shows a longitudinal section through another bitumen blowing reactor according to the invention:

Referring to FIG. 1, a cylindrical reactor vessel is provided with an air outlet 2 on the upper part of the reactor vessel 1. The base 3 of the vessel 1 has a charging aperture 4 through which bitumen to be treated, i.e., the soft residues of petroleum distillation which it is desired to convert into asphaltic bitumen of desired degree of hardness, may be pumped into the vessel. The asphaltic bitumen thus produced may be removed through a discharge aperture 5 in the base of the reactor vessel.

An air inlet 6 into the base portion of the reactor vessel 1 has an end 7 located below an agitator 8 in the form of a vane mixer driven through a shaft 9. The drive is effected by a motor 10 having a shaft 11 connected to a torque converter 12. An output shaft 13 of the torque converter is connected to the agitator shaft 9 through a bevel gear 14. The torque converter 12 may operate conventionally either hydraulically or mechanically. The output transmitted from the shaft 13 is practically equal to that transmitted from the drive shaft 11, but the speed of the shaft 13 varies according to the degree of resistance encountered by the agitator 8 from the medium being treated.

At the commencement of the process, the bitumen which is to be agitated is free from air and thus offers the agitator mechanism a resistance proportional to its density $\phi_{Bit}$. The output of the drive motor 10 is so calculated that the resistance of the unaerated bitumen to the action of the agitator may be overcome. If now air is conveyed into the contents of the reactor vessel through the air inlet 6 and is dispersed in the form of large air bubbles below the agitator mechanism 8, the result is a mixture of bitumen and air of a density $\phi_{Dis}$ lower than the density $\phi_{Bit}$ to the unaerated bitumen. The result is that less resistance is offered to the movement of the agitator mechanism, so that the speed of the agitator increases accordingly as a result of the variation in torque effected by the torque converter 12 while making full use of the power consumed by the motor. When the amount of air conveyed into the vessel is reduced or cut off, the speed of the agitator mechanism drops owing to the greater density of the bitumen and the greater resistance it offers, the power consumption of the drive motor nonetheless being used to the full.

Referring to FIG. 2 a reactor vessel 21 is provided with an air outlet 22, a reactor base 23, a charging aperture 24, a discharge aperture 25, an air inlet 26 with an end 27, a drive motor 30 having an output shaft 31, a torque converter 32 and a shaft extending 33 therefrom, and a bevel gear 34. Three agitator mechanisms 28, 28' and 28'' are connected to the shaft 29 terminating in the bevel gear 34. The lowermost agitator mechanism is located directly above the end 27 of the air inlet 26. The reactor vessel 21 contains a triple container 35 coaxial with the agitator shaft 29, the lowest floor 36 of which, which is located below the lowest agitator 28, contains a passage 37 and forms a funnel extending upwards towards the rotary portion of the agitator mechanism 28. The floors 38' and 38'' of the triple container which also form funnels, extend upwards towards the rotary portions of the agitator mechanisms 28' and 28'' located above the mechanism 28. The fixed portion 39 of the lowest agitator mechanism 28 is fixed to the floor 36 while the fixed portions 39' and 39'' of the higher mechanisms 28' and 28'' are secured to the floors 38' and 38'' respectively.

The air blow in, which forms large bubbles, is conveyed through the funnel-shaped floor 36 to the agitator 28, by means of which it is dispersed into the bitumen in the form of fine bubbles. The mixture of bitumen and air thus formed rises, as a result of the difference between the specific gravities of bitumen rich in air and bitumen with a low air content, and of the action of the agitator in the container, in an upward direction, thus reaching the floor 38' located below the next higher agitator 28', where the air bubbles form relatively large air pockets or sacs which then slide upwards at an angle on the funnel-shaped floor 38' and move towards the agitator 28' by which they are again broken up into small bubbles. The same then occurs between the agitator 28' and the uppermost agitator 28''. The mixture of air and bitumen rises above the edge 40 of the container 35 and the air is liberated at the surface of the vessel contents, so that the bitumen again has either no air content or a low air content, and flows down the outside of the container 35 within the reactor vessel; when it reaches the lower regions of the vessel, air is again forced in.

The advantages which have already been discussed in detail are also obtained in an apparatus of this type when the torque converter 32 is used.

The following results were obtained in practical tests:

The following values were measured in a reactor vessel of the type shown in FIG. 2 but not equipped with a torque converter, for the power consumption of the agitator mechanism at an agitator speed of 195 r.p.m.

| | |
|---|---|
| $L_6$ (Agitator operating without air jet) | 20.1 kw |
| $L_m$ (Operation with air jet) | 15.8 kw. |

When a torque converter was used, the speed of the agitator increased when an air jet was used, from 195 r.p.m. to 209 r.p.m. The power consumption of the agitator mechanism was 20.0 kw. Thus the power consumption figure remained almost constant, but when the torque converter was not used, 27% of the rated output was unexploited; this would result in both a low degree of efficiency and high investment costs.

The same reactor used for blowing soft bitumen B 200 (softening point ring and ball; 39°C, Penetration at 25°C; 200 1/10mm) to give a hard B 10 bitumen (softening point ring and ball: 85°C, penetration at 25°C: 8 1/10 mm) at a reaction temperature of 230°C gave the following results:

| Test | Rate of flow Nm3/h | Agitator r.p.m. | Power consumption in kw | Duration of blowing hours |
|---|---|---|---|---|
| | | No torque converter | | |
| 1 | 450 | 195 | 15.8 | 4.0 |
| 2 | 570 | 195 | 14.4 | 4.0 |
| | | With torque converter | | |
| 3 | 570 | 209 | 20.0 | 3.5 |

These figures show that an increase in airflow of 120 Nm3/hour (26% test 2) has no effect on the duration of blowing. This means that absorption at the interface has remained the same in spite of the fact that the rate of airflow has been increased or, in other words, that the air bubbles have increased substantially in size and thus possess a smaller surface per unit of volume. That the air distribution has worsened is also shown by the drop in power consumption of the agitator mechanism of 1.4 kw.

Only when the torque converter (test 3) brought about an increase in speed from 195 r.p.m. to 209 r.p.m. for a power consumption (20.0 kw) which is almost equal to the power consumption of an agitator mechanism when no air is fed in, was it possible to exploit the increase in the rate of flow from 450 Nm3/hour to 570 Nm3/hour, thereby shortening blowing time by half an hour, a reduction of 12.5%.

We claim:

1. A bitumen blowing method comprising blowing air into the region of the bottom of a body of bitumen having agitator means immersed therein, mechanically agitating the bitumen to disperse the air therein to form a mixture of air and bitumen, maintaining the air-bitumen dispersion by regulating the agitation responsive to the amount of air in said mixture, thus accelerating the agitation when the amount of air in the air and bitumen mixture increases and decelerating the agitation when the amount of air in the air and bitumen mixture decreases.

2. The method of claim 1 wherein the air bitumen dispersion is maintained in accordance with the relationship $$d_{B1} = \frac{C \cdot \sigma^{0.6}}{\left(\frac{L}{V}\right)^{0.4} \cdot \phi_{Du}^{0.2}}$$

where $d_{B1}$ is the air bubble diameter, C is an apparatus constant, $\Sigma$ is the surface tension of the liquid, L is the power consumption of the agitator, V is the dispersion volume and $\phi_{Du}$ is the dispersion density.

* * * * *